United States Patent [19]

Jessup et al.

[11] Patent Number: 5,743,597
[45] Date of Patent: Apr. 28, 1998

[54] PIVOTABLE LATERALLY MOVEABLE BELT MOUNT

[75] Inventors: Chris P. Jessup, Sheridan; Jeffry L. Williams, Zionsville, both of Ind.

[73] Assignee: Indiana Mills and Manufacturing, Inc., Westfield, Ind.

[21] Appl. No.: 643,868

[22] Filed: May 7, 1996

[51] Int. Cl.⁶ .......................... A62B 35/00; B60R 22/26; B60R 22/34
[52] U.S. Cl. .................. 297/474; 297/483; 280/801.2; 296/68.1
[58] Field of Search ........................ 297/474, 483, 297/484; 280/801.2, 808, 801.1; 296/68.1

[56] References Cited

U.S. PATENT DOCUMENTS

| | | | |
|---|---|---|---|
| 4,334,701 | 6/1982 | Takada | 297/483 X |
| 4,547,717 | 10/1985 | Radermacher et al. | 280/801.2 X |
| 4,652,053 | 3/1987 | Mikami | 297/483 X |
| 4,765,651 | 8/1988 | Unger | 280/801.2 X |
| 4,801,156 | 1/1989 | Escaravage | 297/483 X |
| 4,892,331 | 1/1990 | Wollner et al. | 280/801.2 |
| 5,015,010 | 5/1991 | Homeier et al. | 297/483 X |
| 5,072,969 | 12/1991 | Kamiyama | 280/801.2 |
| 5,074,591 | 12/1991 | Yano et al. | 280/801.2 |
| 5,294,184 | 3/1994 | Blake et al. | 280/801.2 |

Primary Examiner—Peter M. Cuomo
Assistant Examiner—Rodney B. White
Attorney, Agent, or Firm—Woodard, Emhardt, Naughton Moriarty & McNett

[57] ABSTRACT

A restraint system for use in a vehicle for the restraint of an occupant. The system is comprised of a three point belt assembly wherein the anchor for the shoulder strap is pivotably mounted and laterally adjustable. The system includes a housing mounted atop a vehicle seat with a drive shaft rotatably mounted to the housing and threadably engaged with a post. A belt guide is pivotable mounted to the post.

16 Claims, 4 Drawing Sheets

5,743,597

PIVOTABLE LATERALLY MOVEABLE BELT MOUNT

BACKGROUND OF THE INVENTION

1. Field of the Invention

The present invention relates to vehicle occupant restraint systems and more specifically belt mounts used therein.

2. Description of the Prior Art

Vehicle restraint systems for securing persons in seats within vehicles are well known. A popular approach is the three-point belt assembly which utilizes a retractor having a belt extendable therefrom with the outer end of the belt fixed to the vehicle. A tongue slidably mounted to the belt between the retractor and belt outer end is lockably engagable with a seat belt buckle affixed to the vehicle on the side of the seat opposite of the retractor. As the belt and tongue are extended across the seat to the buckle, a portion of the belt extends downwardly across the shoulder and chest of the driver or passenger whereas the lower portion of the belt extends across the lap.

For maximum comfort, a restraint system should be sized for the user; however, many of the prior restraint systems and the associated seats are of a one size fits all configuration. As such, each belt end is fixedly attached to one location. Although users are of different sizes, this fixed attachment means that the belt will cross the seat in approximately the same position regardless of the user's size. This can cause discomfort to the user. Also known in the prior art are adjustable restraint systems which allow for vertical adjustment. These are normally manual, but may be automatically adjusted when the seat is moved forward or aft in the vehicle. Disclosed herein is a restraint system having a control allowing the user to size the restraint for his or her size.

SUMMARY OF THE INVENTION

An adjustable seat belt system to secure a person in a seat within a vehicle. The system is comprised of a belt anchor mountable in a vehicle as part of a three-point belt assembly with a belt having a first end mountable to the vehicle and a second end secured to the belt anchor which may have a guide or a D-loop. A first connector is movably mounted to the belt between the first end and the second end. A second connector, mountable to the vehicle, is releasably lockable with the first connector when the first connector with the belt is moved across the seat and engaged with the second connector.

A first mounting bracket is mountable to the vehicle. A second mounting bracket is movably mounted laterally with respect to the first mounting bracket with the belt anchor mounted to the second mounting bracket. A controller is associated with the first mounting bracket and the second mounting bracket and is operable to cause controllable relative motion between the first mounting bracket and the second mounting bracket. The second mounting bracket moves the belt anchor with the belt to controllably position the belt.

Therefore, it is an object of this invention to provide a laterally adjustable restraint system mount.

It is another object of the invention to provide a more comfortable restraint system for a vehicle.

It is a further object of this invention to provide a correctly sized occupant restraint system.

Further objects, advantages and features will be apparent from the drawings and detailed description herein.

DESCRIPTION OF THE PREFERRED EMBODIMENT

For the purpose of promoting an understanding of the invention, reference will now be used to describe the preferred embodiment and specific language will now be used to describe the same. It will be understood that no limitation of the invention is intended. It will also be appreciated that future variations, modifications and applications as would normally occur to one skilled in the art are considered within the scope of this invention.

Figure 4:
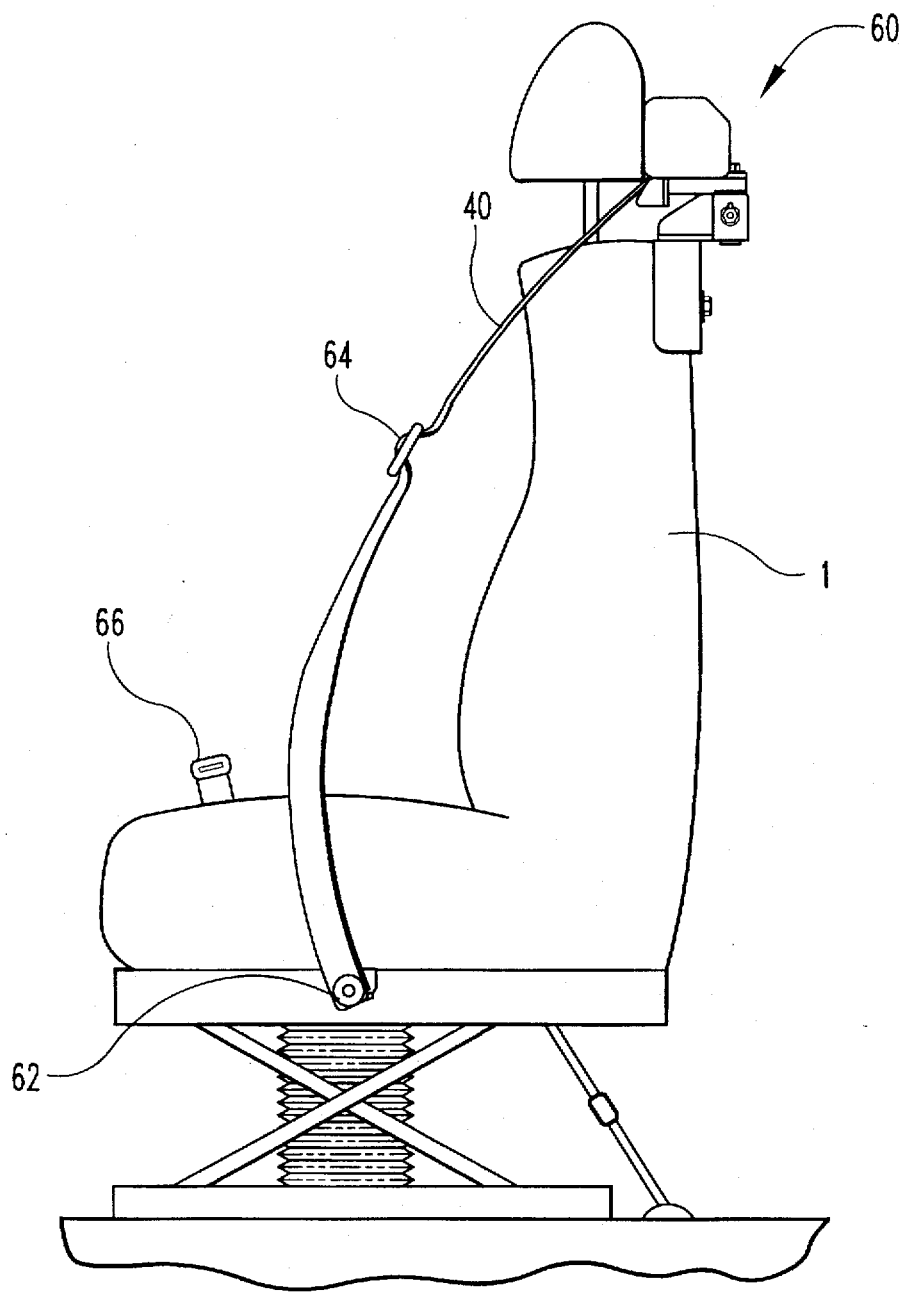
FIG. 4 is a perspective view of the seat belt system having the belt mount of FIG. 1.

Referring first to FIG. 4, a perspective view is shown of the belt mount 60, mounted on a seat 1. In a preferred embodiment of the restraint system, a belt 40 extends from belt mount 60 and has a belt end 62 anchored to seat 1. A first connector 64 is slidably mounted on the belt 40. The first connector 64 is releasably lockable with a second connector 66 anchored to seat 1. The construction of the belt 40 and connectors 64 and 66 will be known and understood by persons of ordinary skill in the art and may be, for example, respectively a tongue and buckle.

Figure 1:
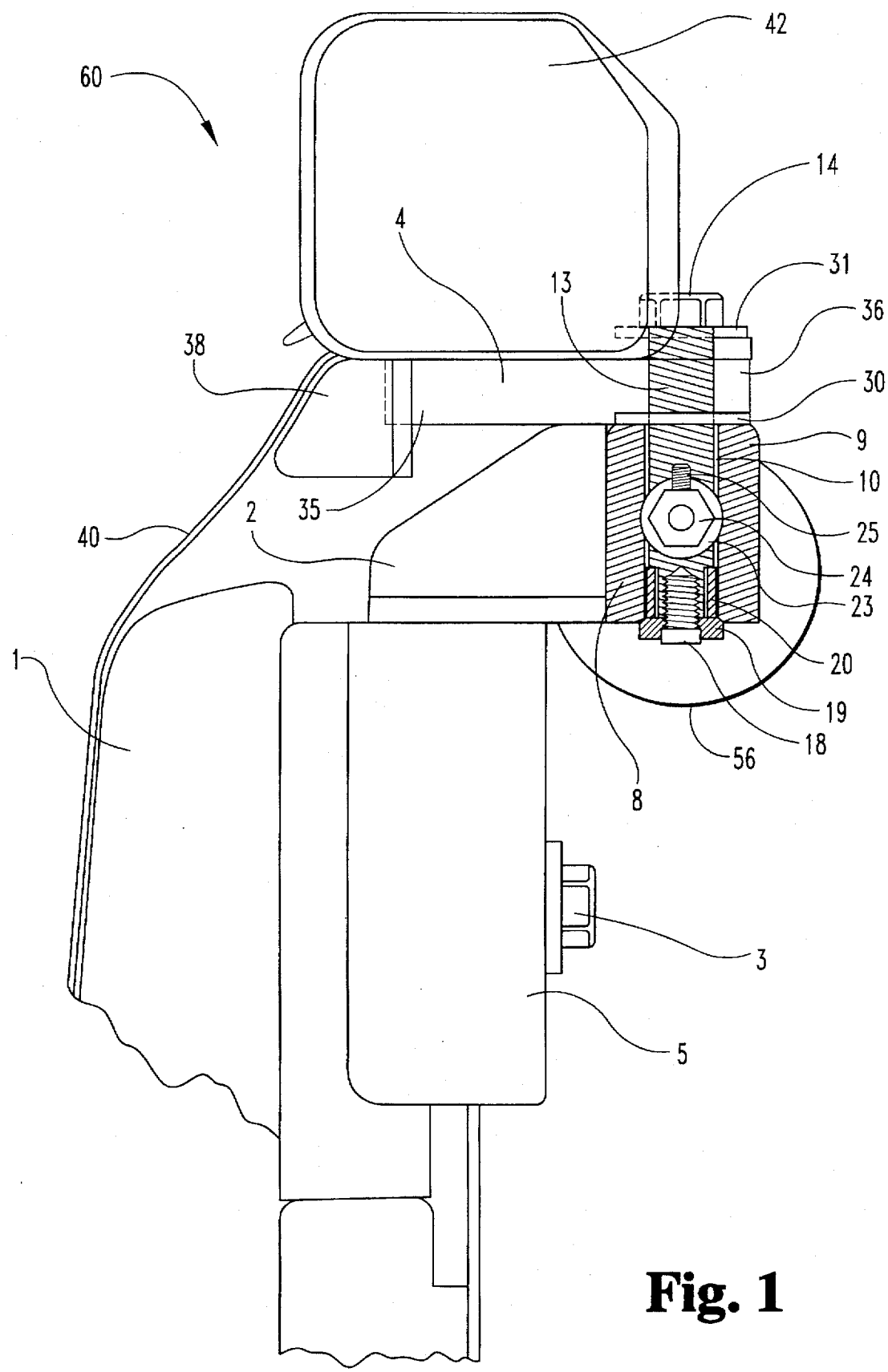
FIG. 1 is a fragmentary side view of a preferred embodiment of the restraint system belt mount mounted to a seat.
Figure 2:
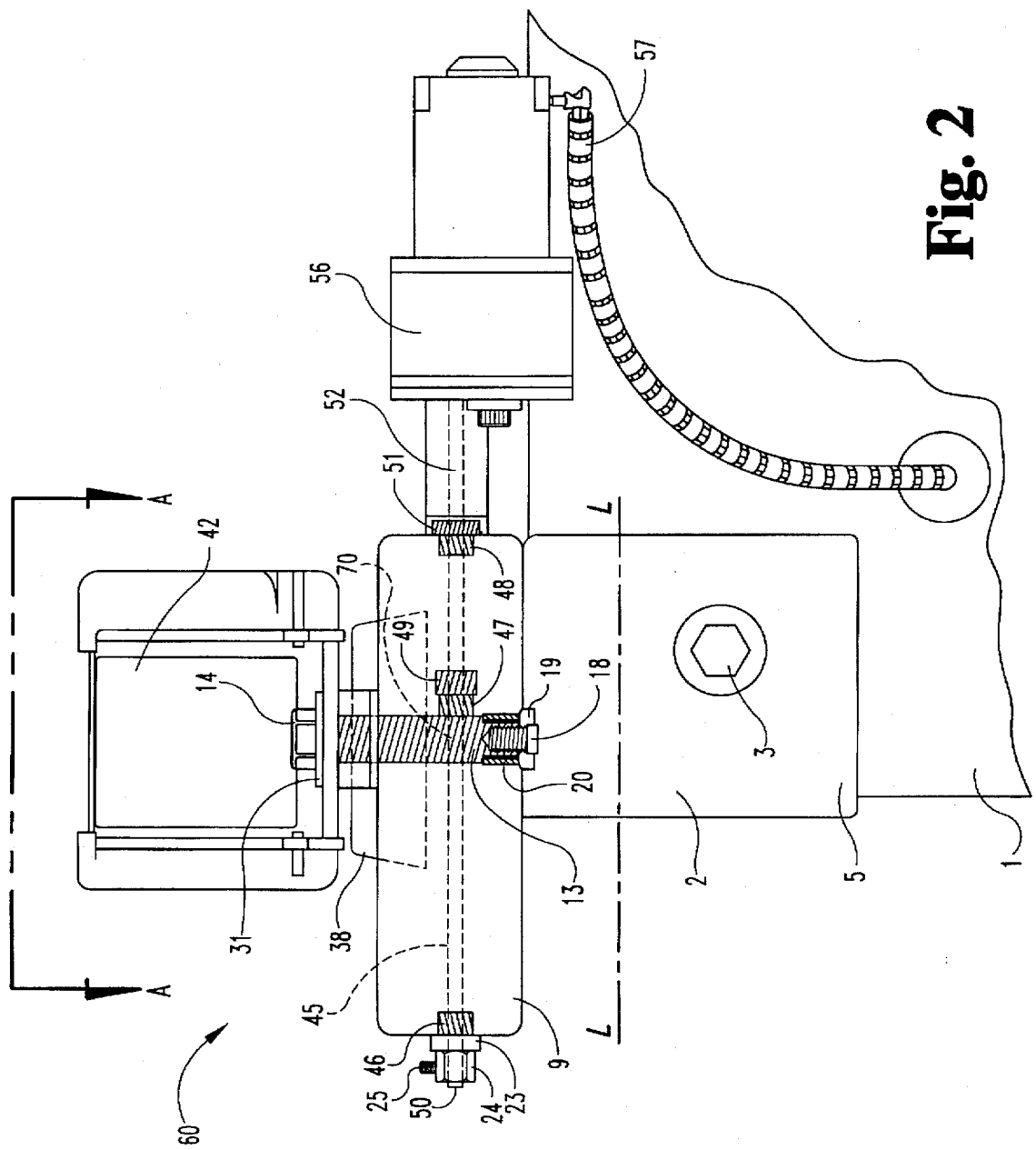
FIG. 2 is a fragmentary rear view of the preferred embodiment of the restraint system belt mount mounted to the seat.
Figure 3:
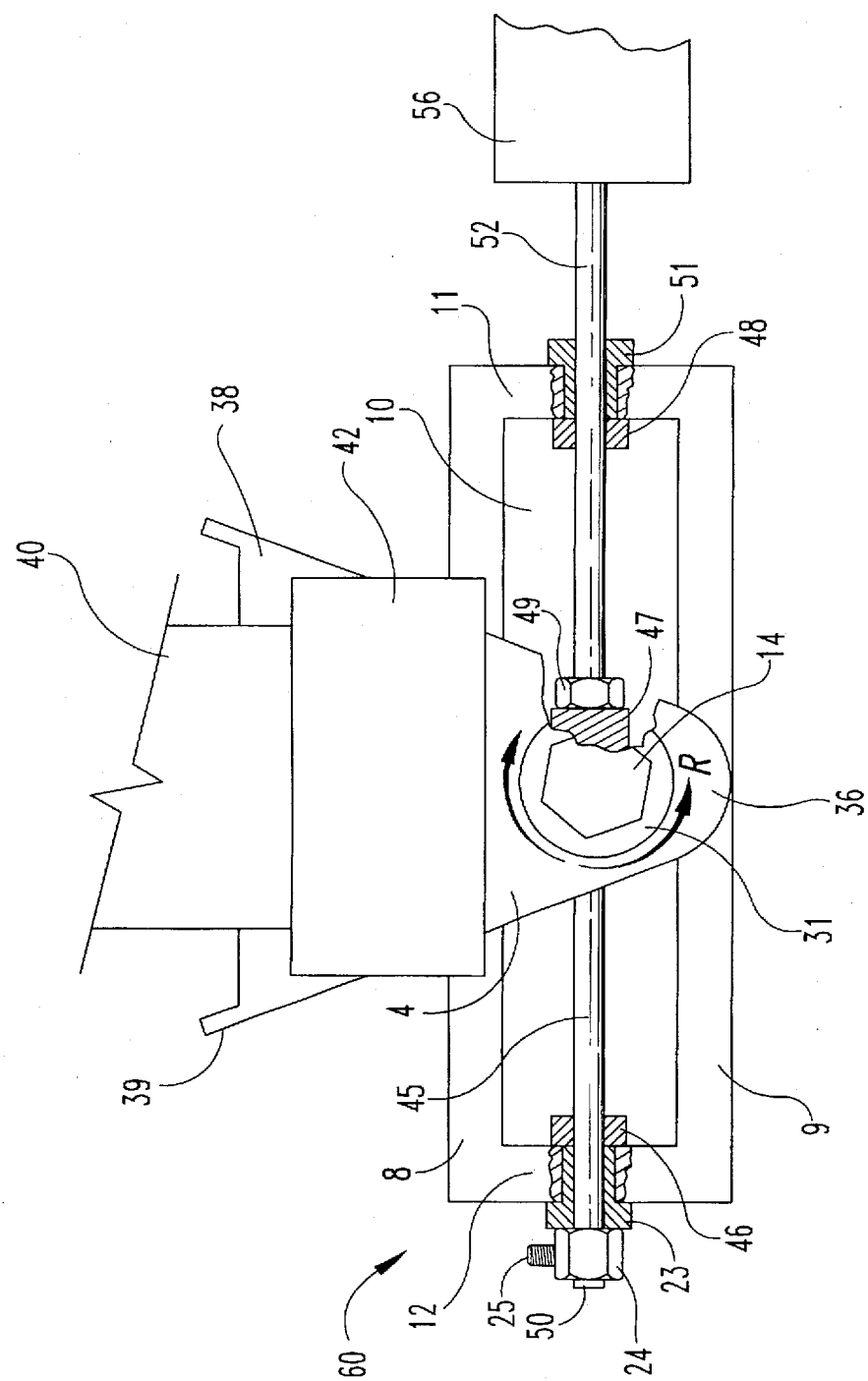
FIG. 3 is an enlarged, top-down, fragmentary view taken along line A—A of FIG. 2 and viewed in the direction of the arrows.

Referring now to FIGS. 1 and 2, a preferred embodiment of the invention is illustrated. Vehicle seat 1 includes a three-point belt assembly with a pivotable laterally adjusted belt mount 60. The belt mount 60 is mounted on a conventional seat 1 by a first mounting bracket 2. First mounting bracket 2 has a seat portion 5 anchored to the seat 1 by mounting bolt 3. The first mounting bracket 2 has at its top end a housing comprised of two anchor plates 8 and 9 spaced apart and connected at their ends by end plates 11 and 12 (FIG. 3) defining slot 10.

A post 13 extends through slot 10 and connects to end 36 (FIG. 1) of a second mounting bracket or pivot arm 4. Post 13 is laterally movable in slot 10 with respect to seat 1 along an axis shown by line L—L (FIG. 2). Pivot arm 4 is pivotably mounted to post 13 and is pivotable along line R—R (see FIG. 3). Pivot arm 4 has an outer end 35 coupled to a web guide 38 which guides the belt 40. Web guide 38 may optionally have flanges 39 for directing belt 40 or alternatively use a D-loop (not shown) to guide the belt. A retractor 42 is fixedly mounted atop pivot arm 4. Belt retractors are quite well known such as, for example, disclosed in the commonly owned U.S. Pat. No. 4,911,377 which is herewith incorporated by reference.

A socket head cap screw 18 (FIG. 1) extends through a T-nut 19 and is screwed into the reduced diameter bottom end of post 13 holding a cylindrical plastic bearing 20 in position and securing the post 13 in the slot 10. The diameter of T-nut 19 is larger than the width of slot 10 and thus extends against the downward facing bottom surfaces of plates 8 and 9 limiting upward movement of post 13. Bearing 20 extends around the bottom end of post 13 providing a bearing surface contacting the mutually facing surfaces of plates 8 and 9. The pivot arm 4 is spaced apart from the first mounting bracket 2 by first washer 30 through which post 13 extends. Post 13 further extends through second washer 31 positioned between pivot arm 4 and post cap 14.

A rotatable, threaded drive shaft 45 (FIG. 3) extends freely through end plates 11 and 12, is positioned between anchor plates 8 and 9 and is in meshing engagement with an internally threaded hole 70 (FIG. 2) of post 13. One end 50 of the drive shaft 45 extends through the end plate 12 and is held by a nut 24. Nut 24 is secured to the drive shaft by a set screw 25. This nut is spaced apart from plate 12 by a first plastic bushing 23. The first bushing 23 additionally extends through plate 12 between plate 12 and drive shaft 45. The second end 52 of the drive shaft 45 extends through end plate 11 and is connected to the output shaft of the gear motor 56 having a power cord 57. Three rubber grommets 46, 47 and 48 are located on the drive shaft 45. The first rubber grommet 46 is located on the drive shaft 45 at the end of slot 10 adjacent plate 12. The second rubber grommet is located on the drive shaft adjacent to post 13 and on the side toward the motor 56. The second grommet 47 is held in place by a limiting nut 49 on drive shaft 45. The third rubber grommet 48 is located at the end of slot 10 adjacent plate 11. A second plastic bushing 51 extends around drive shaft 45 between plate 11 and drive shaft 45.

Grommet 46 acts as a bumper to limit lateral movement of post 13 so that post 13 does not contact end plate 12. Limiting nut 49 and second grommet 47 are adjustable along drive shaft 45 to provide a selected lateral limit on the lateral movement of post 13. Grommet 47 acts as a bumper to limit post 13 from contacting limiting nut 49. It will be appreciated that limiting nut 49 may be interchanged with two limiting nuts (not shown) or other adjustable limiting means. Grommet 48 limits contact between limiting nut 49 and plate 11.

Adjustment of the belt mount 60, and thus the position of belt 40 relative to the occupant, is accomplished by sliding post 13 in a lateral direction within slot 10. Although this could be done manually, in the preferred embodiment a gear motor 56 is used to rotate the drive shaft 45 to move post 13. The belt mount is pivotably moveable by pivoting second mounting bracket 4 around post 13 in the directions indicated by line R—R in FIG. 3.

In the embodiment illustrated, the belt mount is mounted on the rear of a seat and the second connector and belt end are mounted on the seat as a seat integrated product. However, it will be appreciated that the belt mount, second connector and belt end may be mounted in other locations on the seat or directly to the vehicle. Similarly, the retractor shown in FIG. 1 can be mounted near the shoulder or it can be mounted near the floor.

The invention contemplates and includes use of a hand crank, a hand slidable clamp, or a rail guide with a slidable bracket and a retaining pin to laterally adjust the belt mount.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An adjustable seat belt system to secure a person in a seat within a vehicle comprising:

a belt anchor mountable in a vehicle;

a three-point belt assembly including a belt having a first end mountable to the vehicle and a second end secured to said belt anchor, said assembly including first connector means movably mounted to said belt between said first end and said second end, said assembly further including second connector means mountable to the vehicle with said second connector means releasably lockable with said first connector means when said first connector means with belt is moved across said seat and engaged with said second connector means;

a first mounting bracket mountable to the vehicle;

a second mounting bracket movably mounted laterally with respect to said first mounting bracket with said belt anchor mounted to said second mounting bracket; and, a controller associated with said first mounting bracket and said second mounting bracket and operable to cause controllable relative motion between said first mounting bracket and said second mounting bracket, said second mounting bracket moving said belt anchor with said belt to controllably position said belt.

2. The system of claim 1 wherein said belt assembly has a retractor.

3. The system of claim 2 wherein said second end of said belt is connected to said retractor.

4. The system of claim 2 and further comprising a web guide coupled to said retractor.

5. The system of claim 4 wherein said web guide is pivotably mounted to said second mounting bracket.

6. The system of claim 5 wherein:

said first mounting bracket has four plates and a slot defined by said plates, said first mounting bracket further has an axis;

said second mounting bracket has a post which is movable along said axis and restrained within said slot in said first mounting bracket; and said web guide is pivotally mounted to said post of said second mounting bracket.

7. The system of claim 4 wherein said controller is powered to provide relative motion between said first mounting bracket and said second mounting bracket.

8. The system of claim 7 and further comprising a rotatable drive shaft coupled to said second mounting bracket and said controller to provide relative motion between said first mounting bracket and said second mounting bracket.

9. The system of claim 1 wherein said first mounting bracket has a position limiter for limiting the lateral movement of said second mounting bracket.

10. An adjustable seat belt system to secure a person in a seat within a vehicle comprising:

a belt anchor mountable in a vehicle;

a three-point belt assembly including a belt having a first end mountable to the vehicle and a second end secured to said belt anchor, said assembly including first connector means movably mounted to said belt between said first end and said second end, said assembly further including second connector means mountable to the vehicle with said second connector means releasably lockable with said first connector means when said first connector means with belt is moved across said seat and engaged with said second connector means;

a first mounting bracket mountable to the vehicle;

a second mounting bracket movably mounted laterally with respect to said first mounting bracket with said belt anchor mounted to said second mounting bracket; and, control means associated with said second mounting bracket for causing controllable relative motion between said first mounting bracket and said second mounting bracket, said second mounting bracket moving said belt anchor with said belt to controllably position said belt.

11. The system of claim 10 wherein said belt assembly has a retractor.

12. The system of claim 11 wherein said retractor is positioned at said second end of said belt.

13. The system of claim 11 further comprising a web guide coupled to said retractor.

14. The system of claim 13 wherein said retractor is pivotably mounted with respect to said second mounting bracket.

15. The system of claim 13 wherein said control means is powered to provide relative motion between said first mounting bracket and said second mounting bracket.

16. The system of claim 15 further comprising a rotatable drive shaft coupled to said second mounting bracket and said control means, said rotatable drive shaft rotatable to provide relative motion between said first mounting bracket and said second mounting bracket.

* * * * *